(12) United States Patent
Wang

(10) Patent No.: US 11,807,014 B2
(45) Date of Patent: Nov. 7, 2023

(54) VALVE ASSEMBLY AND INK CARTRIDGE WITH THE VALVE ASSEMBLY

(71) Applicant: HANGZHOU CHIPJET TECHNOLOGY CO., LTD., Hangzhou (CN)

(72) Inventor: Zhiping Wang, Hangzhou (CN)

(73) Assignee: HANGZHOU CHIPJET TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/257,301

(22) PCT Filed: Dec. 5, 2019

(86) PCT No.: PCT/CN2019/123354
§ 371 (c)(1),
(2) Date: Dec. 31, 2020

(87) PCT Pub. No.: WO2021/056824
PCT Pub. Date: Apr. 1, 2021

(65) Prior Publication Data
US 2022/0410578 A1 Dec. 29, 2022

(30) Foreign Application Priority Data

Sep. 25, 2019 (CN) .......................... 201910911959.3

(51) Int. Cl.
*B41J 2/175* (2006.01)
*F16K 31/126* (2006.01)
(52) U.S. Cl.
CPC ....... *B41J 2/17513* (2013.01); *B41J 2/17596* (2013.01); *F16K 31/1266* (2013.01)

(58) Field of Classification Search
CPC ................ B41J 2/17513; B41J 2/17553; B41J 2/17596; F16K 15/063; F16K 15/18; F16K 31/1262; F16K 31/1266
See application file for complete search history.

(56) References Cited

U.S. PATENT DOCUMENTS 5,555,238 A * 9/1996 Miyazawa ........... B41J 2/17513
347/86
6,000,788 A * 12/1999 Lida ..................... B41J 2/17596
137/859

(Continued)

FOREIGN PATENT DOCUMENTS

| CN | 1481996 A | 3/2004 |
| CN | 2910576 Y | 6/2007 |

(Continued)

OTHER PUBLICATIONS

China Office action of CN201910990450.2, a related application of CN201910911959.3.

(Continued)

*Primary Examiner* — Anh T Vo

(57) ABSTRACT

A valve assembly and an ink cartridge with the valve assembly are provided. The valve assembly includes a valve cover, a valve base, a diaphragm and a transfer column. The valve cover is disposed on the valve base to define a valve cavity, and the diaphragm is disposed between the valve cover and the valve base and configured for separating the valve cavity into a first deformable cavity and a second deformable cavity independent with each other. The transfer column is fixed in the valve cavity and penetrates through the diaphragm, and at least one of the transfer column and the diaphragm is provided with a passage. The diaphragm moves relative to the transfer column due to a pressure difference between the first deformable cavity and the second deformable cavity, resulting in opening or cutting off (Continued)

communication between the first deformable cavity and the second deformable cavity by the passage.

17 Claims, 10 Drawing Sheets

(56) References Cited

U.S. PATENT DOCUMENTS

2002/0135646 A1   9/2002   Usui
2004/0051766 A1   3/2004   Miyazawa et al.
2016/0288520 A1   10/2016  Kato et al.

FOREIGN PATENT DOCUMENTS

| CN | 108839444 A | 11/2018 |
| CN | 208074211 U | 11/2018 |
| CN | 110715082 A | 1/2020 |
| EP | 1398156 A2 | 3/2004 |
| JP | 3902716 B2 | 4/2007 |
| JP | 2007185940 A | 7/2007 |

OTHER PUBLICATIONS

The extended European search report of 19940955.8.
International Search Report of PCT/CN2019/123354.

* cited by examiner

VALVE ASSEMBLY AND INK CARTRIDGE WITH THE VALVE ASSEMBLY

CROSS REFERENCE TO RELATED APPLICATIONS

This application is a 371 of international PCT patent application PCT/CN2019/123354 filed on Dec. 5, 2019, which claims all benefits accruing from China Patent Application No. 201910911959.3, filed on Sep. 25, 2019, in the China National Intellectual Property Administration, the content of which is hereby incorporated by reference.

TECHNICAL FIELD

The present disclosure generally relates to printing devices, and in particular, to a valve assembly and an ink cartridge with the valve assembly.

BACKGROUND

With the development of technology, printers have become a necessary equipment in business offices, which in turn has led to a boom in printing consumables. There are a variety of printing consumables, such as ink cartridges, toner cartridges, and so on. After an ink cartridge is installed into a printer and the printer is in a printing state, a negative pressure will be formed in an ink storage cavity along with the consumption of ink, and the pressure inside and outside the ink cartridge is required to maintain balance, to ensure that the printing will not be interrupted. In addition, unbalanced pressure inside and outside the ink cartridge will result in ink supply system abnormalities. For example, excessive pressure in printing process will result in color loss. When the printer is not in operation, unbalanced pressure will lead to ink leakage, resulting in color mixing. So that printing performance is unstable and unreliable, and printing quality is poor.

In order to avoid ink leakage and print interruption before the ink runs out, it is necessary to improve pressure balance performance and sealing performance of the ink cartridge. Conventional ink cartridges have a deformable chamber connected to an inflation port and a one-way valve that closes or opens when the deformable cavity expands or contracts. It can effectively remove air bubbles in print head, but requires more space in the ink storage cavity, and the deformable cavity is not beneficial to high-intensity printing, resulting in a shorter service life of the ink cartridges.

SUMMARY

Thus, to solve the above problems in the prior art, it is desired to provide a valve assembly with a simple and compact structure. The valve assembly has long service life, and has good air pressure balance and great sealing performances.

It is also desired to provide an ink cartridge with a simple and compact structure. The ink cartridge has a long service life, and has good air pressure balance and great sealing performances, to solve the above problems in the prior art.

Specifically, one embodiment of the present disclosure can provide a valve assembly. The valve assembly can include a valve cover, a valve base, a diaphragm and a transfer column. The valve cover is disposed on the valve base to define a valve cavity, and the diaphragm is disposed between the valve cover and the valve base and configured for separating the valve cavity into a first deformable cavity and a second deformable cavity independent with each other.

The transfer column is fixed in the valve cavity and penetrates through the diaphragm, and at least one of the transfer column and the diaphragm is provided with a passage. The diaphragm can move relative to the transfer column due to a pressure difference between the first deformable cavity and the second deformable cavity, resulting in opening communication between the first deformable cavity and the second deformable cavity by the passage, or cutting off the communication between the first deformable cavity and the second deformable cavity.

Another embodiment of the present disclosure can provide an ink cartridge. The ink cartridge can include a housing and the valve assembly above. The housing is provided with an air charging hole and an ink outlet hole, and the valve assembly is located in the housing and can be configured for communicating the air charging hole with the ink outlet hole and cutting off thereof.

The valve assembly and an ink cartridge with the valve assembly of the present embodiment have many advantages.

The valve assembly has better air pressure adjustment and sealing performances. The diaphragm can flexibly move relative to the transfer column due to a pressure difference between the first deformable cavity and the second deformable cavity, and adjust its position on the transfer column, in order to open and cut off/close the communication between the first deformable cavity and the second deformable cavity. Thus, the second deformable cavity can have a certain negative pressure during printing, so that the ink can be stabilized. This manner of adjusting the air pressure balance can achieve ink to flow out stably, and the printing effect is better. In addition, the structure of the valve assembly is simple, compact, stable and reliable, thereby having a long service life. Moreover, the valve assembly in the ink cartridge provided in the present application has a smaller volume, so that the ink cartridge can have a larger ink storage volume.

Figure 1:
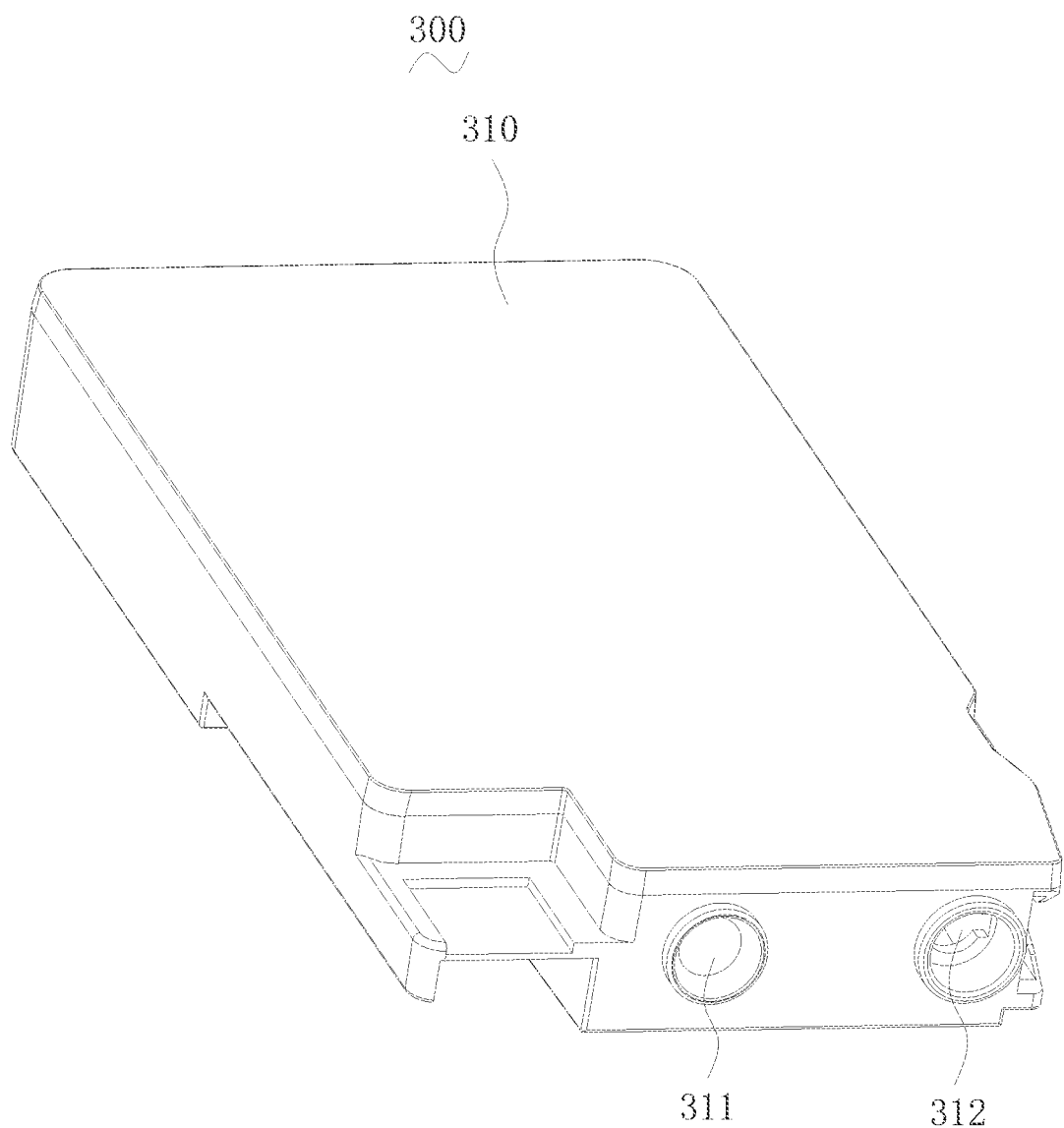
FIG. 1 is a perspective view of an ink cartridge in a first embodiment of the present disclosure.

In the figures, 100 represents a valve assembly; 110 represents a valve cover; 111 represents a limiting member; 120 represents a valve base; 122 represents a groove; 123 represents a through hole; 130 represents a diaphragm; 131 represents a first protrusion; 132 represents a second protrusion; 133 represents a guide portion; 1330 represents a center hole; 134 represents a fixed portion; 135 represents an extending portion; 140 represents a transfer column; 150 represents an elastic member; 200 represents a valve cavity; 210 represents a first deformable cavity; 220 represents a second deformable cavity; 300 represents a ink cartridge; 310 represents a housing; 311 represents an air charging hole; 312 represents an ink outlet hole; 314 represents a separator; 3141 represents a communication hole; 315 represents a base; 316 represents a cover; 3161 represents a flange; 3162 represents a air inlet hole; 320 represents a inflation passage; 321 represents a first cavity; 322 represents a second cavity; 400 represents an ink storage cavity; 410 represents a first ink storage cavity; 420 represents a second ink storage cavity; 50 represents a blocking portion.

DETAILED DESCRIPTION

The present disclosure will be further described in detail below with reference to the drawings and specific embodiments, in order to better understand the objective, the technical solution and the advantage of the present disclosure. Obviously, embodiments described are only some, but not all of the embodiments of the present disclosure. Based on the embodiments of the present application, all other embodiments obtained by a person of ordinary skill in the art without creative efforts all belong to the scope of protection of the present application.

It should be noted that when a component is considered to be "installed on" another component, it can be directly on another component or there can be a centered component. When a component is considered to be "disposed on" another component, it can be disposed directly on another component or there may be a centered component at the same time. When a component is considered to be "fixed to" another component, it can be directly fixed to another component, or there may be a centered component.

It should be understood that in the description of the present disclosure, an orientation or a position relationship indicated by location words such as "front, back, up, down, left, right", "transverse, portrait, vertical, horizontal" and "top and bottom" are usually based on an orientation or a position relationship shown in the attached figures, which is only for the convenience of describing the present disclosure and simplifying the description. These location words do not indicate and imply that the device or element referred to must have a specific orientation or be constructed and operated in a specific orientation, so it can't be understood as a restriction on the scope of the present disclosure; the location words "inside and outside" refer to the inside and outside of the outline relative to each component itself.

Unless otherwise defined, all technical and scientific terms used herein have the same meaning as a skilled person in the art would understand. The terminology used in the description of the present disclosure is for the purpose of describing particular embodiments and is not intended to limit the present disclosure. The term "or/and" as used herein includes any and all combinations of one or more related listed items.

Referring to FIG. 1 to FIG. 5, a first embodiment of the present disclosure provides an ink cartridge 300.

The ink cartridge 300 can include a housing 310 and a valve assembly 100. The valve assembly 100 can be located in the housing 310 and configured for adjusting air pressure in the ink cartridge 300.

Specifically, an ink storage cavity 400 is defined in the housing 310 and configured for accommodating and storing ink. A side wall of the housing 310 is provided with an air charging hole 311 and an ink outlet hole 312.

When the ink cartridge 300 is installed into a printer, the air charging hole 311 is connected with an air pump (not shown), and pressurizes the air into the ink cartridge 300, making the ink in the ink storage cavity 400 flow out from the ink outlet hole 312 under negative pressure. The outflow ink can be delivered to printing nozzles.

During a printing process, the ink cartridge 300 can supply ink. At this time, the air pump is evacuated, the air charging hole 311 is in communication with the atmosphere, the ink in the ink storage cavity 400 is continuously consumed, and a negative pressure will be generated in the ink storage cavity 400. If the negative pressure inside the ink storage cavity 400 is too large, it can lead to color loss, and the ink in the ink cartridge 300 cannot flow out stably; if the negative pressure inside the ink storage cavity 400 is too small, the ink in the ink cartridge 300 can leak out and color mixing will occur at the same time when the print is not in operation, which makes printing performance unstable and unreliable, and print quality poor. Therefore, it is necessary to adjust the pressure balance inside and outside the ink storage cavity 400.

Therefore, in the present preferred embodiment, the air pressure in the ink storage cavity 400 can be adjusted by the valve assembly 100. On the one hand, the valve assembly 100 is configured for ensuring that the ink cartridge 300 can stably press the ink output when the ink cartridge 300 is installed to the printer; on the other hand, the ink flow supplied to the printer is stable and controllable in a printing state, so as to ensure a printing effect. The valve assembly 100 and the ink cartridge 300 provided by the present disclosure have great air pressure balance performance and sealing performance.

Furthermore, the valve assembly 100 includes a valve cover 110, a valve base 120, a diaphragm 130 and a transfer column 140. The valve cover 110 is disposed on the valve base 120 to define a valve cavity 200. The diaphragm 130 is disposed between the valve cover 110 and the valve base 120 and configured for separating the valve cavity 200 into a first deformable cavity 210 and a second deformable cavity 220 independent with each other.

In this present preferred embodiment, the first deformable cavity 210 is relatively close to the valve cover 110, and the second deformable cavity 220 is relatively close to the valve base 120. In a pressure process, the first deformable cavity 210 can communicate with the air pump of the printer, the second deformable cavity 220 can communicate with the ink outlet 312; in the printing process, the first deformable cavity 210 can communicate with the atmosphere, and the second deformable cavity 220 can communicate with the ink outlet 312.

Furthermore, the diaphragm 130 of the embodiment can include a guide portion 133 and a fixed portion 134. The guide portion 133 is located in the central position of the diaphragm 130 and can move along an axis of the transfer column 140. The guide portion 133 is provided with a central hole 1330, and the inner surface of the central hole 1330 is sheathed on a side wall of the transfer column 140. Preferably, the central hole 1330 and the transfer column 140 can form an interference fit, so as to realize a sealing contact between the inner surface of the central hole 1330 and the side wall of the transfer column 140 and ensure the sealing effect.

The fixed portion 134 is located at an edge of the diaphragm 130 and fixed between the valve base 120 and the valve cover 110. The fixed portion 134 is bent relative to a surface of the diaphragm 130.

In order that the guide portion 133 can respond to the air pressure, the diaphragm 130 can further include an extending portion 135, which is located between the guide portion 133 and the fixed portion 134, and the extending portion 135 is bent relative to the surface of the diaphragm 130.

Preferably, a bending direction of the extending portion 135 is opposite to a bending direction of the fixed portion 134. A structure of the diaphragm 130 provided in the preferred embodiment is easy to make the guide portion 133 depressed, and the guide portion 133 can have a certain deformation allowance when the guide portion 133 is depressed. The diaphragm 130 is not only more sensitive and rapid in response to the air pressure, but also stable and reliable.

Furthermore, since the fixed portion 134 of the diaphragm 130 is fixed between the valve base 120 and the valve cover 110, in order to better fix the diaphragm 130, an upper surface of the valve base 120 is correspondingly provided with a groove 122 along an edge of the upper surface for embedding the fixed portion 134.

Furthermore, the transfer column 140 is fixed in the valve base 120 and penetrates through the diaphragm 130, and the transfer column 140 is provided with a passage 141 capable of transmitting air. The diaphragm 130 is elastic and can deform and reset, so that the diaphragm 130 can deform for responding to a pressure difference between the first deformable cavity 210 and the second deformable cavity 220. When an air pressure value of the first deformable cavity 210 is greater than that of the second deformable cavity 220, the diaphragm 130 can deform and move towards the second deformable cavity 220; when the air pressure value of the first deformable cavity 210 is less than that of the second deformable cavity 220, the diaphragm 130 can deform and move towards the first deformable cavity 220.

When the diaphragm 130 is deforming and moving, the position of the transfer column 140 sheathed by the diaphragm 130 will change, so that an air path between the first deformable cavity 210 and the second deformable cavity 220 can be open or closed through the passage 141.

Preferably, the passage 141 is arranged on the side wall of the transfer column 140 and extends downward from a top end of the transfer column 140. It can be understood that the passage 141 may also not penetrate through the top end of the transfer column 140, at this time, the passage 141 can extend along the side wall of the transfer column 140.

In one embodiment, the passage 141 may also extend inside the transfer column 140, that is, one part of the passage 141 can be a hole penetrating through the transfer column 140 and the other part of the passage 141 can be a groove located on the side wall of the transfer column 140, so that the passage 141 is in an L-like shape. It can be understood that one end of the passage 141 can be arranged on the upper surface or the side wall of the transfer column 140, and the other end of the passage 141 can be arranged on the side wall of the transfer column 140. Two ends of the passage 141 can be in a straight line, a curve or a broken line. Without affecting a technical effect that the first deformable cavity 210 can communicate the second deformable cavity 220 through the passage 141, other deformations and structures of the passage 141 are within the scope of the present disclosure.

In this present preferred embodiment, a bottom end of the transfer column 140 can be located on the valve base 120 to form an integrity structure, and the transfer column 140 can extend from the valve base 120 to the valve cover 110 along an axis of the transfer column 140. It can be understood that the transfer column 140 and the valve base 120 can also be separated from each other, which is not described here.

The inner surface of the valve cover 110 is provided with a limiting member 111 for accommodating a top end of the transfer column 140, and the limiting member 111 is couple to the transfer column 140 and substantially in an annular shape. It can be understood that, the limiting member 111 can also be in a square or other regular or irregular shape according to a shape of a cross section of the transfer column 140, which is not limited in the present disclosure.

Furthermore, in order to ensure an air tightness of the valve cavity 200, upper and lower surfaces of the diaphragm 130 can extend towards the first deformable cavity 210 and the second deformable cavity 220 respectively, forming a first protrusion 131 and a second protrusion 132, wherein the central hole 1330 penetrates the first protrusion 131 and the second protrusion 132.

Specifically, an upper surface of the first protrusion 131 can abut against the limiting portion 111 to achieve a seal effect between the first protrusion 131 and the limiting portion 111, and the inner surface of the second protrusion 132 is attached to the side wall of the transfer column 140 to achieve a seal effect between the second protrusion 132 and the transfer column 140.

In one embodiment, a length of the passage 141 along an axis of the transfer column 140 is less than or equal to a length of the transfer column 140, so that the passage 141 can selectively communicate with the first deformable cavity 210 and/or the second deformable cavity 220.

Figure 2:
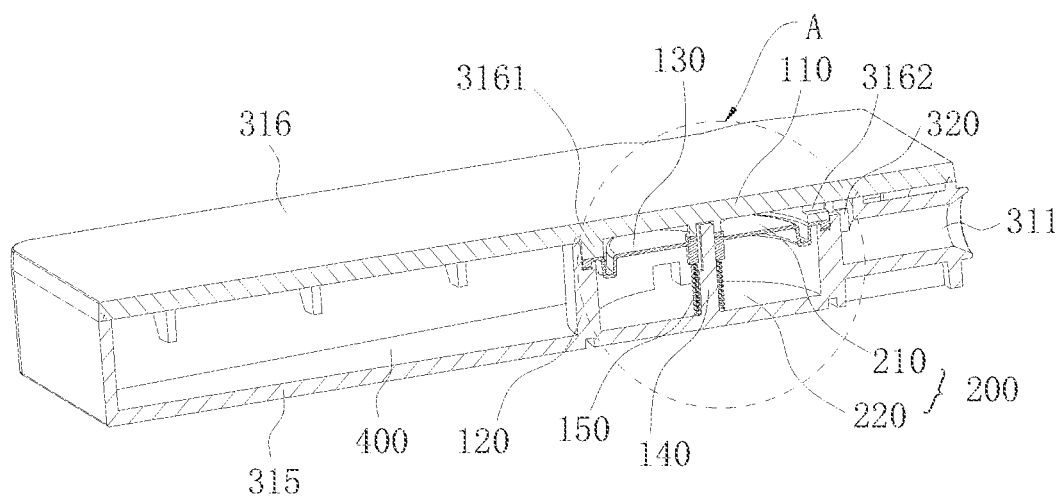
FIG. 2 is a cross sectional view of the ink cartridge of FIG. 1.
Figure 3:
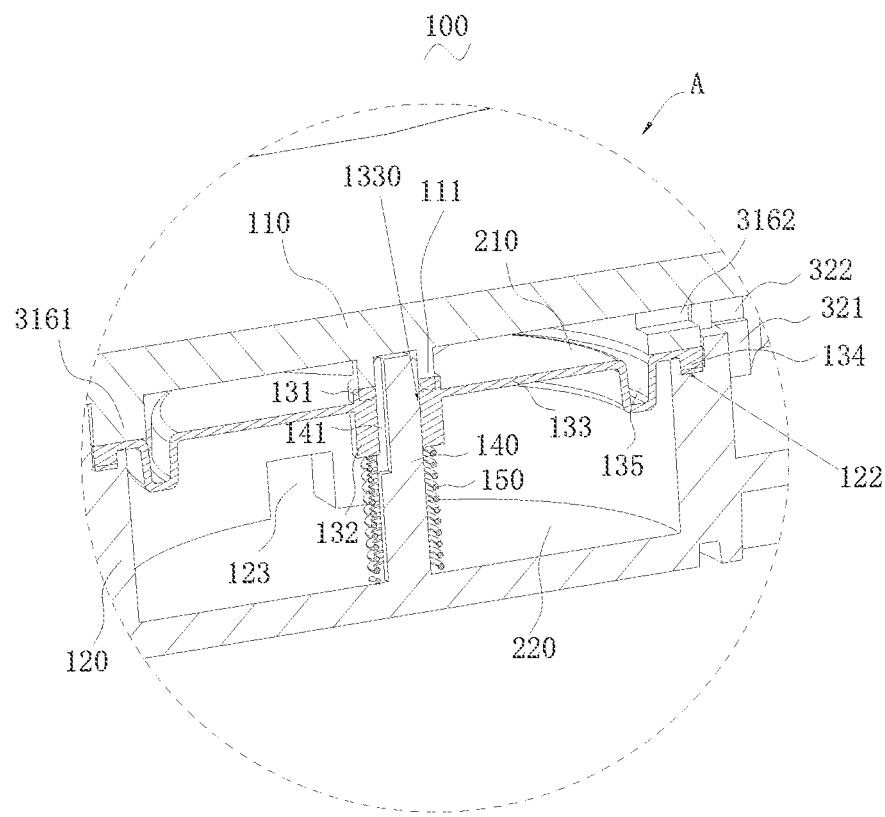
FIG. 3 is an enlarged cutaway view of part A of the valve assembly with an air path in a closed state of FIG. 2.

Referring to FIG. 2 and FIG. 3, in a first state, air pressure values on the upper and lower surfaces of the diaphragm 130 are in a balanced state. The first protrusion 131 can abut against the limiting portion 111 to achieve a seal effect. The first deformable cavity 210 and the passage 141 are in a sealed state, and the air path is not open.

Figure 4:
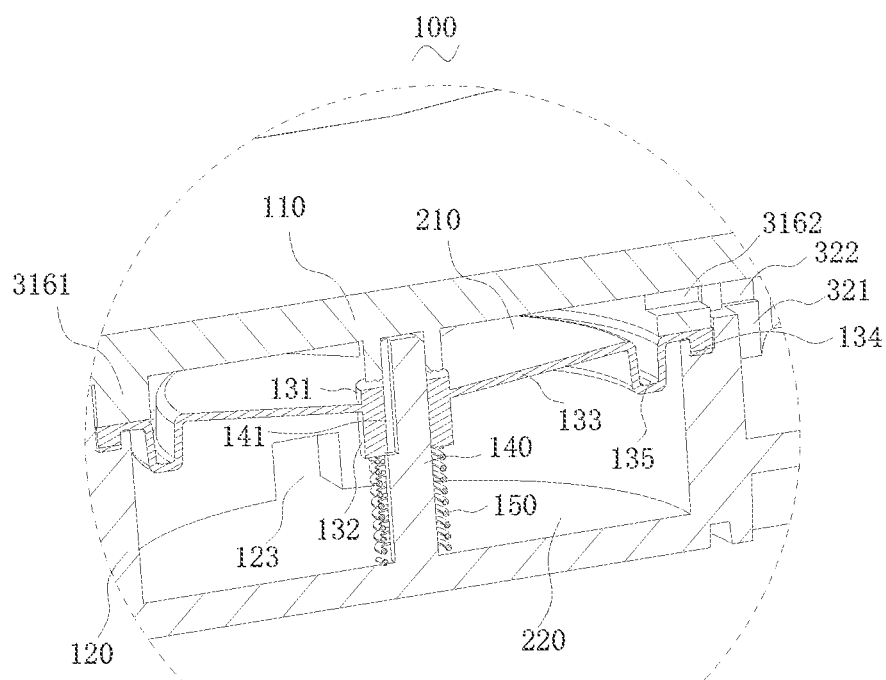
FIG. 4 is a cross sectional view of the valve assembly with the air path in an open state of FIG. 3.

Referring to FIG. 4, in a second state, the air pressure value of the first deformable cavity 210 is greater than that of the second deformable cavity 220, and the diaphragm 130 can move towards the second deformable cavity 220, so that there is a gap between the first protrusion 131 and the limiting portion 111. The first deformable cavity 210 and the passage 141 are in an air path open state, and the lowest point of the second protrusion 132 is located above the lowest point of the passage 141, so that the air path between the second deformable cavity 220 and the passage 141 are in an open state. Therefore, the first deformable cavity 210 communicates with the second deformable cavity 220.

Figure 5:
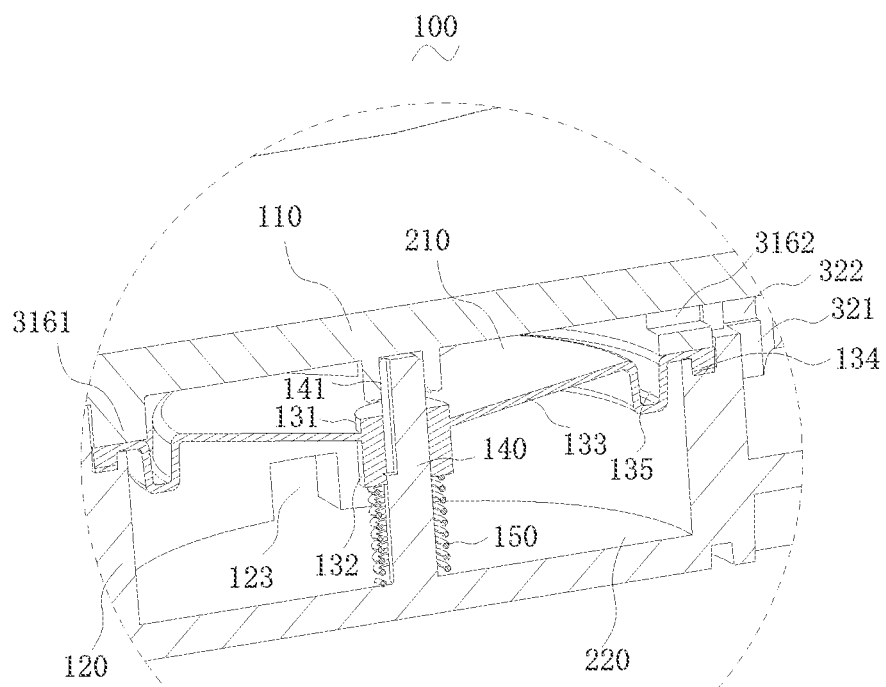
FIG. 5 is another cross sectional view of the valve assembly with the passage in the closed state of FIG. 3.

Referring to FIG. 5, in a third state, the air pressure value of the first deformable cavity 210 is far greater than that of the second deformable cavity 220, and the diaphragm 130 can keep moving towards the second deformable cavity 220. At this time, there is a gap between the first protrusion 131 and the limiting portion 111, so that the air path between the first deformable cavity 210 and the passage 141 is in an open state, but the lowest point of the second protrusion 132 is located below the lowest point of the passage 141. The air path between the second deformable cavity 220 and the passage 141 is closed, so the first deformable cavity 210 does not communicate with the second deformable cavity 220.

It can be understood that, the first deformable cavity 210 can communicate with the air charging hole 311, and in the process of pressuring the ink cartridge 300, the air pressure values of entering from the air charging hole 311 is large enough, at this time, the diaphragm 130 can move from the first state to the third state in a short time, and with the deformation of the diaphragm 130 itself, the air in the second deformable cavity 220 can be discharged from the ink outlet hole 312, resulting in the ink flowing out.

In other embodiments, the passage 141 may also penetrate through the transfer column 140. At this time, a part of the passage 141 is located at a bottom of the second deformable cavity 220, and a width or size of the groove on the part of passage 141 is sufficiently small, so that when the diaphragm 130 moves to the bottom of the second deformable cavity 220 in the third state, the air path between the first deformable cavity 210 and the second deformable cavity 220 is similar to a disconnection effect.

In the present preferred embodiment, the passage 141 is arranged in a straight line with respect to the axis of the transfer column 140 and partially extends. In other embodiments, the passage 141 may also be arranged in a curved line with respect to the axis of the transfer column 140. The present disclosure is not limited as long as the communication between the first deformable cavity 210 and the second deformable cavity 220 can be achieved.

It can be understood that a length of the passage 141 along the axis of the transfer column 140 can be less than the length of the transfer column 140. It can prevent a phenomenon that when the air pump is suddenly pressurized, the atmospheric pressure in the first deformable cavity 210 is excessively large, causing a large amount of air to be transmitted to the first ink storage cavity 410 by the second deformable cavity 220, and resulting in the ink flowing out. In other embodiments, the passage 141 may also penetrate through the transfer column 140, and at this time, the over-pressured airflow will be buffered by extending the length of the second protrusion 132. However, the second protrusion 132 is excessively long in length, which will not be beneficial for the deformation of the diaphragm 130.

After a pressurization is completed, the air pump is withdrawn, and the printer is disconnected from the air charging hole 311 of the ink cartridge 300, and at this time, the first deformable cavity 210 communicates with the atmosphere. Because the air pressure values within the first deformable cavity 210 is relatively decreased, the diaphragm 130 may sequentially move from the third state to the second state and the first state under the action of its own elastic force.

The first deformable cavity 210 communicates with the second deformable cavity 220 while the diaphragm 130 moves to the second state, so as to balance the air pressure on upper and lower surfaces of the diaphragm 130. When the diaphragm 130 moves to the first state, the first protrusion 131 can abut against the limiting portion 111 and achieve a sealing effect, and the atmosphere does not enter the valve cavity 200, so that the pressure in the ink storage cavity 400 can be returned to a certain negative pressure value. After the air charging, not only can the fluidity of the ink emission be effectively ensured, but also the air bubbles in the printer nozzle can be pumped back into the ink storage cavity 400.

During the printing process of the printer, the printing nozzle draws ink from the ink outlet hole 312 of the ink cartridge 300, and the ink in the second deformable cavity 220 is constantly consumed. The negative pressure in the second deformable cavity 220 will be further increased. When the negative pressure difference in the second deformable cavity 220 is greater than an elastic force of the diaphragm 130 itself, the diaphragm 130 can move from the first state to the second state under the action of the negative pressure difference.

When the diaphragm 130 moves to the second state, air can enter the first deformable cavity 210 and the second deformable cavity 220 sequentially from the air charging hole 311. The negative pressure value in the second deformable cavity 220 can be reduced. In this case, the air pressure value in the second deformable cavity 220 gradually increases. When the pressure difference between the pressure of the second deformable cavity 220 and the pressure of the first deformable cavity 210 is less than the elastic force of the diaphragm 130 itself, the diaphragm 130 returns to the first state under its own elastic force. In this way, the negative pressure value in the second deformable cavity 220 can be controlled within a stable range.

In one embodiment, the valve assembly 100 can further include an elastic member 150. The elastic member 150 is sheathed on the transfer column 140, and one end of the elastic member 150 can abut against an inner surface of the second deformable cavity 220. The other end of the elastic member 150 can abut against the second protrusion 132 of the diaphragm 130. Thus, the first protrusion 131 always has a tendency to abut against the limiting portion 111. In order to ensure the sealing performance of the first deformable cavity 210, the diaphragm 130 can be reset by the resilient force of the elastic member 150 itself in a state in which the diaphragm 130 is recessed and the external force is withdrawn. In a preferred embodiment, the elastic member 150 may be a spring and sheathed on the transfer column 140. It can be understood that the elastic member 150 may be another elastic element or may be connected between the second protrusion 132 and the inner surface of the second deformable cavity 220.

The elastic member 150 is arranged such that the diaphragm 130 needs to overcome the elastic force of the elastic member 150 itself and the frictional force between the diaphragm 130 and the side wall of the transfer column 140 when it is recessed towards the second deformable cavity 220. Only when the air pressure difference between the first deformable cavity 210 and the second deformable cavity 220 is greater than a total of the elastic force of the elastic member 150 and the frictional force between the diaphragm 130 and the side wall of the transfer column 140, the diaphragm 130 can be recessed and the first protrusion 131 detaches from the limiting portion 111. The air path communicates with each other, so that it also can prevent a phenomenon that when the air pump is suddenly pressurized, the atmospheric pressure in the first deformable cavity 210 is excessively large, causing a large amount of air to be transmitted to the first ink storage cavity 410 by the second deformable cavity 220, and resulting in the ink splashing. It can be understood that the elastic coefficient of the diaphragm 130 may also be reasonably set, so that the diaphragm 130 itself has a function of an elastic member, and the elastic member 150 may be omitted at this time.

Figure 6:
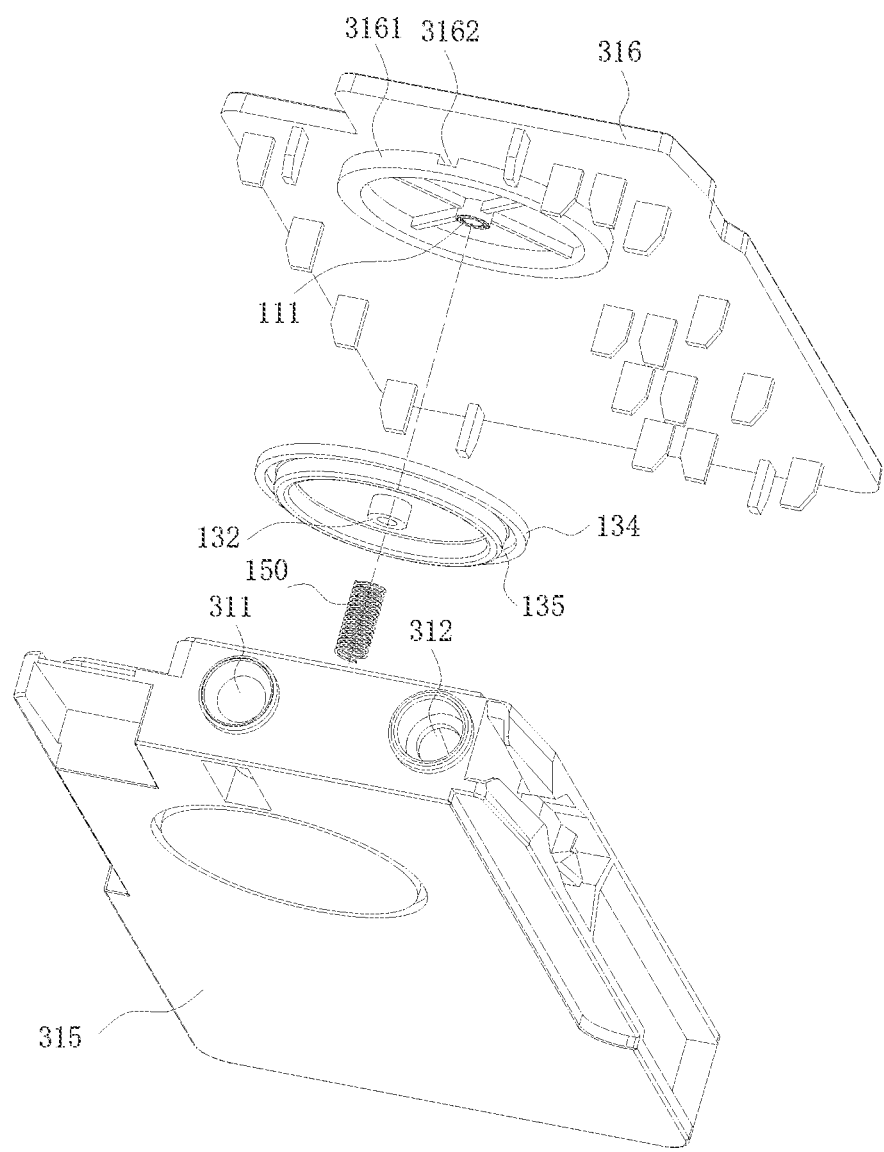
FIG. 6 is an exploded view of the ink cartridge in another embodiment of the present disclosure.
Figure 7:
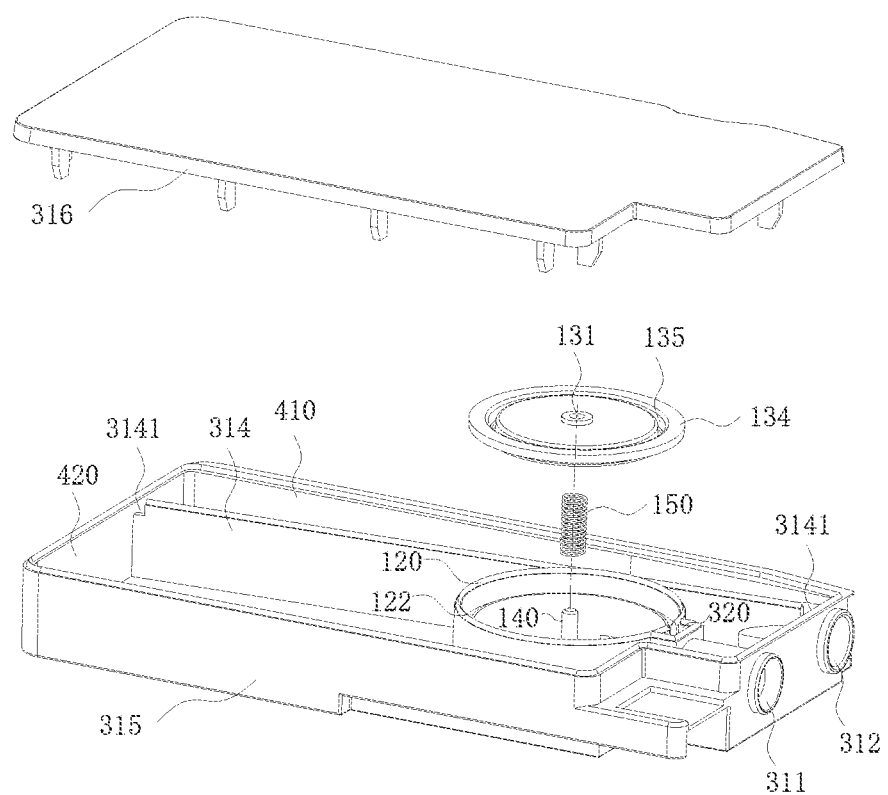
FIG. 7 is an exploded view of the ink cartridge of FIG. 6 with another view angle.
Figure 8:
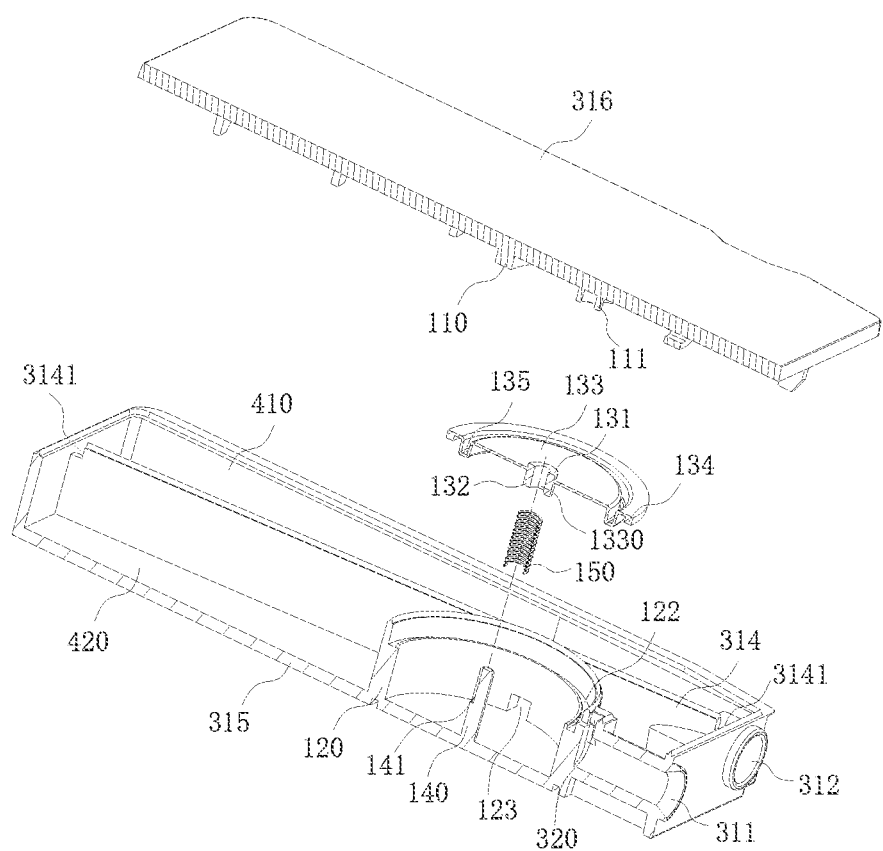
FIG. 8 is an exploded cutaway view of the ink cartridge of FIG. 6 with another view angle.

Referring to FIG. 6 to FIG. 8 together, the ink cartridge 300 is illustrated.

The ink cartridge 300 can include a housing 310 and the valve assembly 100 described above.

Specifically, the housing 310 has a box shape, and the housing 310 is formed by buckling a base 315 and a cover 316. It can be understood that the base 315 and the cover 316 may be arranged separately, and may be fixed by screwing, welding, riveting or snap-fitting, or may be arranged integrally. For the housing 310, a regular or irregular shape may be disposed as required for assembly.

The air charging hole 311 and the ink outlet hole 312 are located on a side wall of the base 315. Preferably, the ink outlet hole 312 and the air charging hole 311 are located on the same side wall of the base 315, so as to facilitate installation and actual use. By providing the ink outlet hole 312 and the air charging hole 311 relatively close to each other, the air path between the air charging hole 311 and the ink outlet hole 312 can be shortened.

It can be understood that, the ink outlet hole 312 and the air charging hole 311 may also be located on adjacent side walls of the base 315, and the position of the ink outlet hole 312 and the air charging hole 311 may be adjusted according to the requirements of use.

Furthermore, the valve cover 110 and the cover 316 in the present preferred embodiment can be integrally formed, and the valve base 120 and the base 315 can also be integrally formed.

The inner surface of the cover 316 is provided with a flange 3161 facing the valve base 120, and the flange 3161 is embedded in the valve base 120. The outer surface of the flange 3161 and the inner surface of the valve base 120 may form a clearance fit or interference fit. The diaphragm 130 is located between the valve base 120 and the flange 3161, the lower side of the flange 3161 can abut against the upper side of the fixed portion 134 of the diaphragm 130, and the upper side of the valve base 120 can abut against the lower side of the fixed portion 134 of the diaphragm 130. A closed valve cavity 200 is formed between the flange 3161 and the valve base 120, and the diaphragm 130 divides the valve cavity 200 into the first deformable cavity 210 and the second deformable cavity 220.

In this embodiment, the valve base 120 is disposed close to the air charging hole 311. Preferably, the air charging hole 311 can extend from the side wall of the base 315 along its own axis to the side wall of the valve base 120. An inflation passage 320 is disposed between the first deformable cavity 210 and the air charging hole 311, and the inflation passage 320 includes a first cavity 321 communicating with the air charging hole 311 and a second cavity 322 communicating with the first deformable cavity 210. The inflation passage 320 is in a stepped structure and a size of the first cavity 321 is smaller than a size of the second cavity 322. In this way, the pressurized air may pass through the first cavity 321 and the second cavity 322 before entering the first deformable cavity 210 from the air charging hole 311. Because the size of the second cavity 322 is larger than the size of the first cavity 321, the pressurized air may be buffered, and as the size increases, the pressure of the pressurized air can decrease, thereby preventing the ink from overflowing due to the excessive pressure entering the first deformable cavity 210.

Specifically, cross sections of the first cavity 321 and the second cavity 322 may be in a square shape, or may be in circular or other regular or irregular shapes, which is not limited in the present disclosure.

Furthermore, the flange 3161 on the inner surface of the cover 316 is provided with an air inlet hole 3162 disposed opposite to the second cavity 322 of the inflation passage 320, and configured to communicate the first deformable cavity 210 with the inflation passage 320. When the ink cartridge 300 is installed into the printer for printing, it needs to pressurize the ink cartridge 300. The pressurized air sequentially can pass through the air charging hole 311, the inflation passage 320, and the air inlet hole 3162 and enter the first deformable cavity 210, so that the pressurized air can act on the diaphragm 130, thereby enabling the diaphragm 130 to respond to the pressure change.

Furthermore, a separator 314 is provided in the base 315, and the separator 314 is used for separating the ink storage cavity 400 into a first ink storage cavity 410 and a second ink storage cavity 420. The first ink reservoir cavity 410 can communicate with the ink outlet hole 312, and the valve base 120 is located in the second ink reservoir cavity 420 and is disposed relatively near the air charging hole 311. The second ink storage cavity 420 can serve as a standby ink storage cavity, which can communicate with the first ink storage cavity 410 and can supply ink to the first ink storage cavity 410 after the ink in the first ink storage cavity 410 is consumed.

The separator 314 is provided with a communication hole 3141 for communicating with the first ink storage cavity 410 and the second ink storage cavity 420, so that the second ink storage cavity 420 and the first ink storage cavity 410 can be kept on the same horizontal plane under a certain air pressure condition. Preferably, the number of the communication holes 3141 is two spaced apart from each other. It is understood that the ink storage cavity 400 may also be separated into more than two cavities.

In this embodiment, the side wall of the valve base 120 is provided with a through hole 123 communicating with the first ink storage cavity 410, so that pressurized air can pass through the air charging hole 311 and the valve base 120 and be transmitted to the first ink storage cavity 410, thereby implementing pressurized ink for the first ink storage cavity 410.

When the ink cartridge 300 provided by the present embodiment is applied to the printer, the printer is provided with a printing nozzle head and an ink truck for accommodating the ink cartridge 300, and the ink cartridge 300 is detachably mounted in the ink truck. An ink supply hole is disposed on the ink truck, and the ink outlet hole 312 of the ink cartridge 300 can be matched with and communicate with the ink supply hole, so that the ink in the ink cartridge 300 can flow through the ink outlet hole 312 to the ink supply hole, and then the ink is transferred to the printing nozzle for printing.

An air pump is further provided on the printer, and the air pump is connected to the air charging hole 311 of the ink cartridge 300 through a flexible pipe and inflates the air charging hole 311 into the ink cartridge 300. The diaphragm 130 is recessed towards the second deformable cavity 220, and the pressurized air can extrude the air in the first ink storage cavity 410 to discharge the ink from the ink out.

Figure 9:
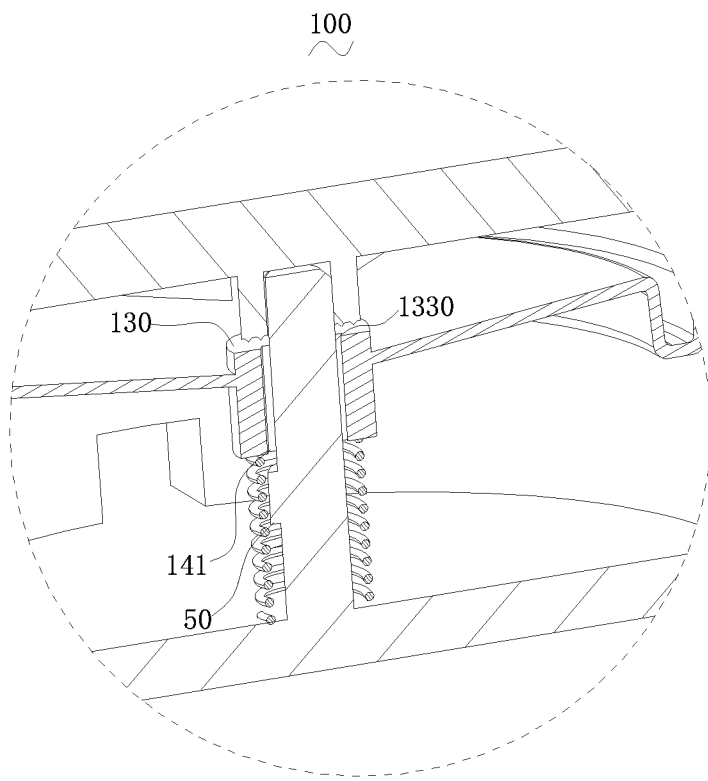
FIG. 9 is a cross sectional view of a part of the valve assembly in the ink cartridge in a second embodiment of the present disclosure.

Referring to FIG. 9, a second embodiment of the present disclosure further provides a valve assembly 100 of another ink cartridge. Compared with the above embodiments, in the present embodiment, the passage 141 of the valve assembly 100 is located on the diaphragm 130. Specifically, the passage 141 is located on an inner side wall of the diaphragm 130 surrounding the center hole 1330. The passage 141 can be groove with an elongated shape and extending vertically, and both ends penetrate the upper and lower surfaces of the diaphragm 130. The passage 141 is located on the diaphragm, which can prevent the transfer column 140 from being damaged during processing because the radial dimension of the transfer column 140 is too small. In addition, since the passage is not located on the transfer column 140, the strength and service life of the transfer column 140 can be greatly improved.

In addition, the transfer column 140 is provided with a blocking portion 50 corresponding to the lower end opening of the passage 141, and the blocking portion 50 can block the lower end opening of the passage 141 after the valve assembly 100 is opened and the diaphragm 130 moves a predetermined distance, so as to cut off the communication between the first deformable cavity 210 and the second deformable cavity 220. The blocking portion 50 is arranged to prevent the second deformable cavity 220 from injecting too much air, resulting in a sputtering phenomenon during printing. In the present embodiment, the blocking portion 50 is a protrusion protruding from the side surface of the transfer column 140, and preferably, the blocking portion 50 and the transfer column 140 can be integrally formed. It can be understood that the specific shape, arrangement manner, etc. of the blocking portion 50 can be changed according to actual needs without being limited to the described embodiments.

Figure 10:
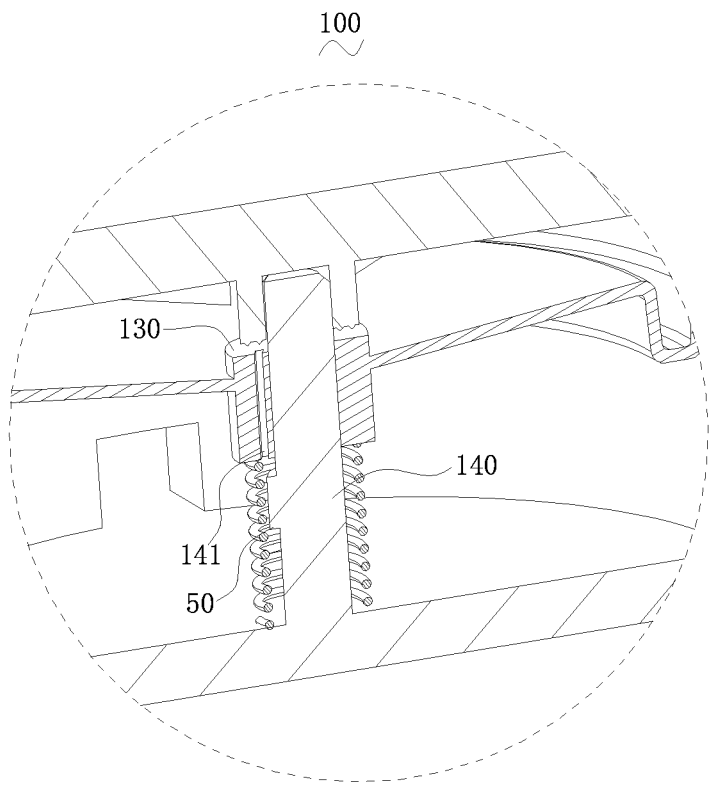
FIG. 10 is a cross sectional view of a part of the valve assembly in the ink cartridge in a third embodiment of the present disclosure.

Referring to FIG. 10, a third embodiment of the present application further provides a valve assembly 100 of another ink cartridge. Compared with the above embodiments, in the present embodiment, the passage 141 of the valve assembly 100 is a through hole located in the diaphragm 130. Furthermore, the passage 141 can be a hole with an elongated shape and extending vertically, and both ends of the passage 141 penetrate through the upper and lower surfaces of the diaphragm 130. Similar to the second embodiment, the passage 141 is located on the diaphragm 130, which can prevent damage during processing of the transfer column 140 due to too small radial dimensions of the transfer column 140. In addition, since the passage is not required to be provided on the transfer column 140, the strength and service life of the transfer column 140 can be greatly improved. In addition, since the passage 141 is a through hole located inside the diaphragm 130, compared with a groove-like structure that needs to be fitted with the transfer column 140, the passage 141 has better sealing performance when sealing is required.

In addition, similarly to the second embodiment, the transfer column 140 is further provided with a blocking portion 50 corresponding to the lower end opening of the passage 141, and the blocking portion 50 can block the lower end opening of the passage 141 after the valve assembly 100 is opened and the diaphragm 130 is moved by a predetermined distance to cut off the communication between the first deformable cavity 210 and the second deformable cavity 220. The blocking portion 50 is arranged to prevent the second deformable cavity 220 from filling too much air, resulting in a sputtering phenomenon during printing.

Figure 11:
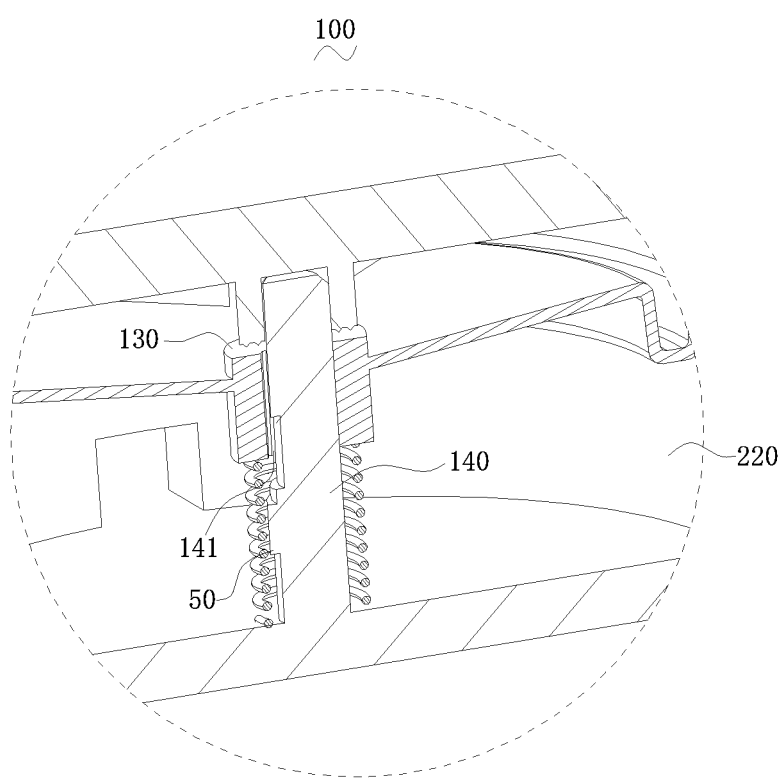
FIG. 11 is a cross sectional view of a part of the valve assembly in the ink cartridge in a fourth second embodiment of the present disclosure.

Referring to FIG. 11, a fourth embodiment of the present application further provides a valve assembly 100 of another ink cartridge. Compared with the above embodiments, in the present embodiment, a part of the passage 141 of the valve assembly 100 is formed on a transfer column 140, and the other part of the passage 141 is formed on a diaphragm 130. Specifically, both the diaphragm 130 and the transfer column 140 are provided with a slot-shaped passage, and two slot-shaped passages form the passage 141. Compared with the above embodiments, in the present embodiment, the cross section of the passage 141 may be larger, and when the valve assembly 100 is opened, the air may be supplemented into the second deformable cavity 220 more quickly, thereby improving the efficiency of air pressure adjustment.

In addition, similar to the second and third embodiments, the transfer column 140 is further provided with a blocking portion 50 corresponding to the lower end opening of the passage 141, and the blocking portion 50 can block the lower end opening of the passage 141 after the valve assembly 100 is opened and the diaphragm 130 moves a predetermined distance to cut off the communication between the first deformable cavity 210 and the second deformable cavity 220. The blocking portion 50 is arranged to prevent the second deformable cavity 220 from filling too much air, resulting in a sputtering phenomenon during printing.

Figure 12:
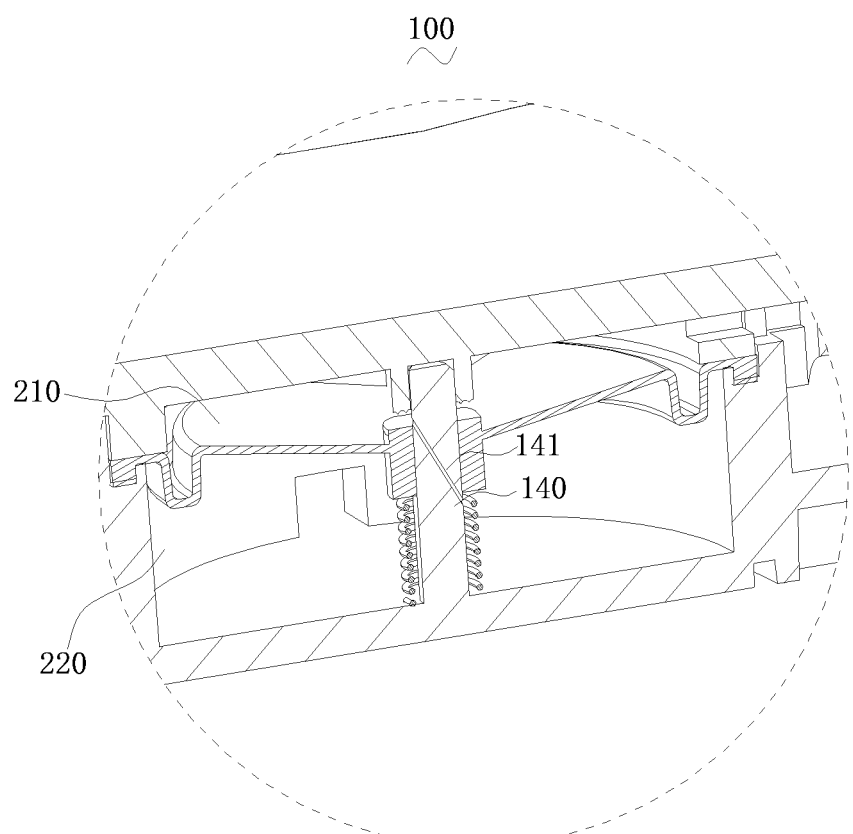
FIG. 12 is a cross sectional view of a part of the valve assembly in the ink cartridge in a fifth embodiment of the present disclosure.

Referring to FIG. 12, a fifth embodiment of the present application further provides a valve assembly 100 of another ink cartridge. Compared with the above embodiments, in the present embodiment, the passage 141 of the valve assembly 100 is located in the through hole of the transfer column 140. The passage 141 is inclined at a predetermined angle with respect to the axis of the transfer column 140. The two ends of the passage 141 penetrate through the circumferential side surface of the transfer column 140, and one end of the passage 141 communicates with the second deformable cavity 220, and the movement of the diaphragm 130 with respect to the transfer column 140 enables the communication of the first deformable cavity 210 with the passage 141 or cuts off the communication of the passage 141 with the first deformable cavity 210. Compared with the above embodiments, in the present embodiment, the hole-shaped passage 141 disposed on the transfer column 140 is obliquely opened, so that the structure of the transfer column 140 can be more uniform and the practical stability can be improved. In addition, the air circulation can be more stable, and the air pressure balancing performance is better.

Figure 13:
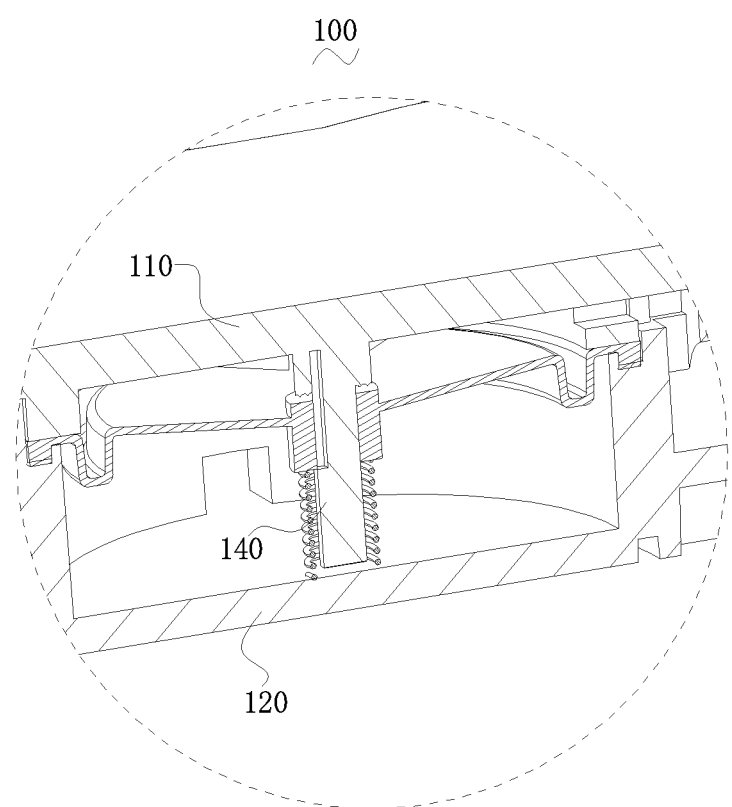
FIG. 13 is a cross sectional view of a part of the valve assembly in the ink cartridge in a sixth embodiment of the present disclosure.

Referring to FIG. 13, a sixth embodiment of the present application further provides a valve assembly 100 of another ink cartridge. Compared with the above embodiments, in the present embodiment, a transfer column 140 of the valve assembly 100 is fixedly connected to the valve cover 110. Specifically, the transfer column 140 and the valve cover 110 are integrally formed to increase the structural strength. The lower end of the transfer column 140 is spaced from the bottom surface of the valve base 120 by a preset distance to avoid installation interference. The transfer column is integrally arranged with the valve cover. Compared with the above embodiments, the periphery of the transfer column has less accessory structure, so that the mould can be designed and machined more easily.

The valve assembly and an ink cartridge with the valve assembly of the present embodiment have better air pressure adjustment and sealing performance. The diaphragm can flexibly move relative to the transfer column due to a pressure difference between the first deformable cavity and the second deformable cavity, and adjust its position on the transfer column, in order to open and cut off/close the communication between the first deformable cavity and the second deformable cavity. Thus, the second deformable cavity can have a certain negative pressure during printing, so that the ink can be stabilized. This manner of adjusting the air pressure balance can achieve ink to flow out stably, and the printing effect is better. In addition, the structure of the valve assembly is simple, compact, stable and reliable, thereby having a long service life. Moreover, the valve assembly in the ink cartridge provided in the present application has a smaller volume, so that the ink cartridge can have a larger ink storage volume.

In addition, it should be noted that the words such as "first" and "second" are used to define the components, and only to facilitate the difference between the corresponding components, for example, the words are not stated otherwise, and the words are not special, and therefore cannot be construed as limiting the scope of protection of the present application.

The technical features of the above-described embodiments may be combined in any combination. For the sake of brevity of description, all possible combinations of the technical features in the above embodiments are not described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

I claim:

1. A valve assembly comprising a valve cover, a valve base, a diaphragm and a transfer column, wherein:
   the valve cover is disposed on the valve base to define a valve cavity, and the diaphragm is disposed between the valve cover and the valve base and configured for separating the valve cavity into a first deformable cavity and a second deformable cavity independent with each other;
   the transfer column is fixed in the valve cavity and penetrates through the diaphragm, and at least one of the transfer column and the diaphragm is provided with a passage;
   the diaphragm is movable relative to the transfer column due to a pressure difference between the first deformable cavity and the second deformable cavity, resulting in opening communication between the first deformable cavity and the second deformable cavity by the passage, or cutting off the communication between the first deformable cavity and the second deformable cavity, and the diaphragm is capable of cutting off the communication between the first deformable cavity and the second deformable cavity at two different positions relative to the transfer column.

2. The valve assembly according to claim 1, further comprising a elastic member sheathed on the transfer column, and one end of the elastic member abuts against an inner surface of the second deformable cavity, and the other end of the elastic member abuts against the diaphragm.

3. The valve assembly according to claim 1, wherein the transfer column is provided with the passage.

4. The valve assembly according to claim 3, wherein a length of the passage along an axis of the transfer column is less than or equal to a length of the transfer column, and
   the passage communicates with the first deformable cavity; or
   the passage communicates with the second deformable cavity; or
   the passage communicates with the first deformable cavity and the second deformable cavity.

5. The valve assembly according to claim 1, wherein the passage is located on a side wall of the transfer column; or, the passage is located inside the transfer column.

6. The valve assembly according to claim 1, wherein the diaphragm is provided with the passage.

7. The valve assembly according to claim 6, wherein a groove is located on an inner surface of a middle part of the diaphragm to define the passage penetrating through the diaphragm; or
   the passage is a through hole penetrating through the diaphragm.

8. The valve assembly according to claim 6, wherein a blocking portion is disposed on the transfer column and near a lower opening of the passage, and the blocking portion is configured for closing the lower opening of the passage when the valve assembly is in an opened state and the diaphragm moves a predetermined distance, resulting in cutting off communication between the first deformable cavity and the second deformable cavity.

9. The valve assembly according to claim 1, wherein one part of the passage is disposed in the diaphragm, and the other part of the passage is disposed on the transfer column.

10. The valve assembly according to claim 1, wherein the diaphragm is movable relative to the transfer column due to the deformation itself; the diaphragm comprises a guide portion and a fixed portion located an edge of the diaphragm, and the guide portion is provided with a center hole, and an inner surface of the center hole is sheathed on a side wall of the transfer column; and the fixed portion is fixed between the valve base and the valve cover; and a limiting member is disposed on a surface of the valve cover near the valve base and sheathed on an end of the transfer column.

11. The valve assembly according to claim 10, wherein a part of the guide portion extends along directions away from and towards the valve base, forming a first protrusion located in the first deformable cavity, and a second protrusion located in the second deformable cavity;
   the center hole penetrates through the first protrusion and the second protrusion; the first protrusion is movable away from or abut against the limiting member when the diaphragm moves.

12. The valve assembly according to claim 1, wherein the transfer column is located on the valve cover to form an integrity structure, or the transfer column is located on the valve base to form an integrity structure.

13. The valve assembly according to claim 1, wherein the valve assembly is a one-way valve assembly.

14. An ink cartridge comprising a housing and the valve assembly according to claim 1, wherein the housing is provided with an air charging hole and an ink outlet hole, and the valve assembly is located in the housing and configured for communicating the air charging hole with the ink outlet hole and cutting off thereof.

15. The ink cartridge according to claim 14, wherein the air charging hole communicates with the first deformable cavity, and the ink outlet hole communicates with the second deformable cavity, and an inflation passage is located between the air charging hole and the first deformable cavity.

16. The ink cartridge according to claim 15, wherein the inflation passage comprises a first cavity communicating with the air charging hole and a second cavity communicating with the first deformable cavity;
   the inflation passage has a stepped shape, and a size of the first cavity is smaller than a size of the second cavity.

17. The ink cartridge according to claim 14, wherein the housing is provided with an ink storage cavity and a separator, and the separator is configured for separating the ink storage cavity into a first ink storage cavity and a second ink storage cavity;

the first ink storage cavity communicates with the ink outlet hole, and the separator is provided with a communication hole for communicating the first ink storage cavity with the second ink storage cavity.

\* \* \* \* \*